United States Patent [19]
Johnson

[11] Patent Number: 6,134,796
[45] Date of Patent: Oct. 24, 2000

[54] AIRCRAFT NAVIGATIONAL PLOTTER

[75] Inventor: Jeffrey W. Johnson, Sugar Land, Tex.

[73] Assignee: Altech Controls Corporation, Missouri City, Tex.

[21] Appl. No.: 09/044,486

[22] Filed: Mar. 19, 1998

Related U.S. Application Data

[60] Provisional application No. 60/040,828, Mar. 20, 1997.

[51] Int. Cl.[7] .............................. G01C 21/20; B43L 7/10
[52] U.S. Cl. .............................. 33/457; 33/1 SD; 33/456
[58] Field of Search .................. 33/1 SB, 1 SD, 33/431, 456, 457, 464, 465, 484, 485, 486, 495; D10/65

[56] References Cited

U.S. PATENT DOCUMENTS

| | | | |
|---|---|---|---|
| D. 142,051 | 8/1945 | White | D10/65 |
| D. 201,385 | 6/1965 | Pelletier, Jr. | D10/65 |
| D. 204,805 | 5/1966 | Gartman et al. | D10/65 |
| D. 249,656 | 9/1978 | Mijail | D10/65 |
| D. 250,754 | 1/1979 | Gray | D10/65 |
| D. 269,415 | 6/1983 | Paton | D10/65 |
| 364,630 | 6/1887 | Bowyer | 33/457 |
| 868,906 | 10/1907 | Cole | 33/431 |
| 1,108,517 | 8/1914 | Potter | 33/431 |
| 1,661,096 | 2/1928 | Rowe | 33/456 |
| 1,942,536 | 1/1934 | Clementi | 33/457 |
| 3,187,434 | 6/1965 | Casagrande | 33/431 |
| 3,303,568 | 2/1967 | Geiger | 33/457 |
| 3,690,009 | 9/1972 | Henley, III | 33/457 |
| 3,813,783 | 6/1974 | Price | 33/1 SD |
| 4,095,342 | 6/1978 | Oertli | 33/1 SD |
| 4,138,817 | 2/1979 | Frost et al. | 33/1 SD |
| 4,637,143 | 1/1987 | Telles | 33/1 SB |
| 4,866,852 | 9/1989 | Plier | 33/431 |
| 4,879,812 | 11/1989 | Rabb | 33/457 |
| 4,969,271 | 11/1990 | Sump | 33/1 SD |
| 5,404,648 | 4/1995 | Taylor | 33/431 |
| 5,983,509 | 11/1999 | Gosselin et al. | 33/1 SD |

FOREIGN PATENT DOCUMENTS

| | | | |
|---|---|---|---|
| 1051574 | 1/1952 | France | 33/431 |

*Primary Examiner*—G. Bradley Bennett

[57] ABSTRACT

A simple easy-to-use aircraft navigational plotter is disclosed. The device is used in conjunction with the signals and readouts received from a pair of VOR (Very high frequency Omni-directional Range) stations. A pair of plotter arms is rotatably connected to a central hub (1) and each is removably attached to a center point (11), which is part of a disc (2), that is affixed to a navigation chart over the VOR stations to be used for navigation. The attachment means of the plotter arms (4) to the center point discs (2) provides for a fit where the plotter arms each may both slide and rotate about the respective center point to which each arm is attached. The pilot of an aircraft may locate position, with respect to the VOR stations, and relative to the terrain depicted on the navigation chart being used by positioning the plotter assembly where the longitudinal centerlines of the plotter arms correspond to radials of the VOR stations that are known by tuning an aircraft VOR receiver and reading a centered course deviation pointer (24) (25). The position of the aircraft is found at the central hub, which is at the intersection of the two corresponding VOR radials, and in relation to the navigation chart.

3 Claims, 9 Drawing Sheets

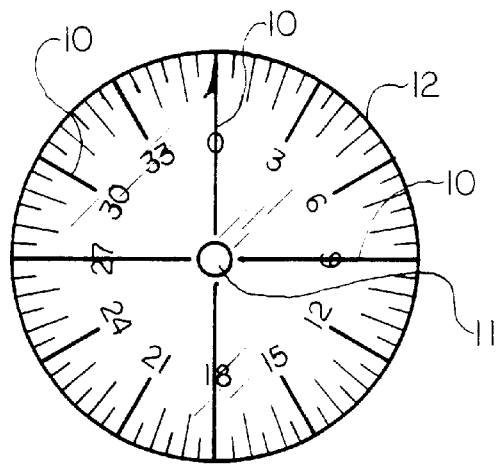
FIG. 4
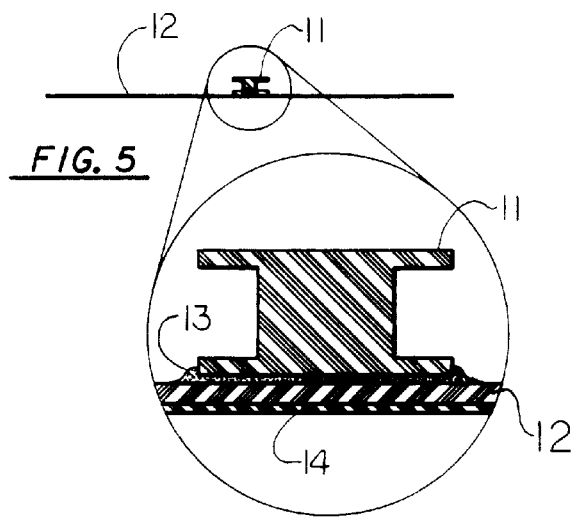
FIG. 5
FIG. 5A
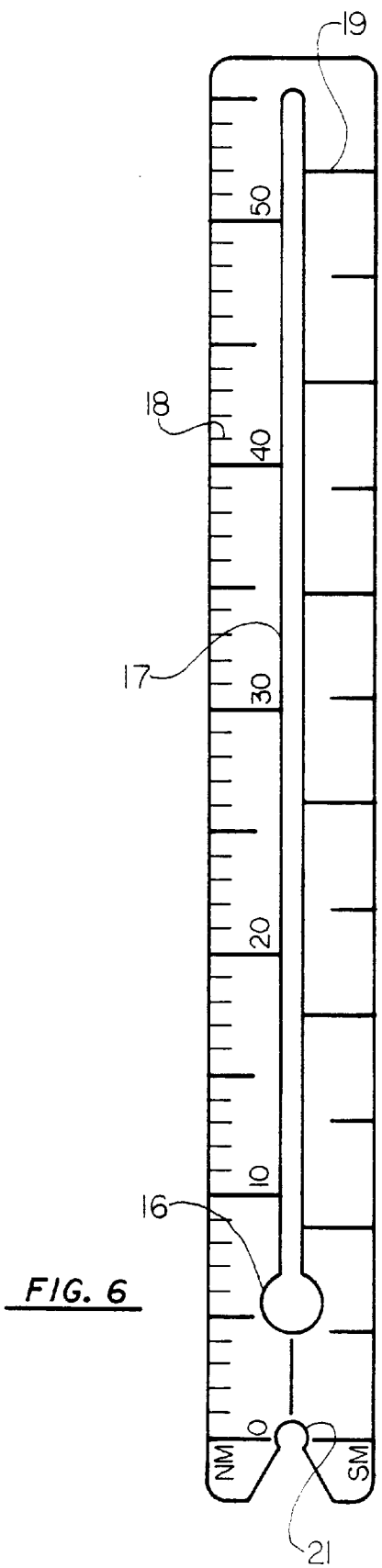
FIG. 6

AIRCRAFT NAVIGATIONAL PLOTTER

RELATED APPLICATION

This application is based on provisional application 60/040,828, filed Mar. 20, 1997, entitled "Aircraft Navigational Mechanical Plotter", which is incorporated herein by reference in its entirety.

BACKGROUND

1. Field of Invention

The present invention relates to a device for navigation—particularly of an aircraft—and primarily to a plotter device intended for use in conjunction with information obtained from one or more instrument displays in the cockpit of an airplane.

2. Description of Prior Art

The FAA (Federal Aviation Administration) maintains a system of radio-navigation stations. These radio-navigation stations consist of radio beacons that contain, within their signals, bearing and/or distance information. Such stations are known as V.O.R. (very-high frequency omni-directional range), NDB (non-directional radio beacon), and V.O.R./TACAN (known as VORTAC, where TACAN is a NATO military system which adds a bearing function to DME, Distance Measuring Equipment), i.e. distance information may be obtained from the TACAN portion of a VORTAC. Pilots of aircraft may have instruments in the aircraft either on the instrument panel or hand-held that provide information of the location of the aircraft relative to the position of one or more radio-navigation stations, through the use of pointers and the like on these instruments.

The N.O.A.A. (National Oceanic and Atmospheric Administration) publishes aeronautical maps that have information about terrain, obstructions, landmarks, rivers, highways, radio-navigation station locations, and other information useful for a pilot. Theses aeronautical maps may be used for the purpose of allowing a pilot to know or determine the position of the aircraft relative to the terrain depictions on the map. Certain of these aeronautical maps provide a blue compass rose (a circle with an indication of magnetic North and the degrees, usually every 5°, from magnetic North) circumscribed about the center point of each VOR/VORTAC and VOR/DME radio-navigation station, and a corresponding blue symbol at the center point of said compass rose that marks the type of station, for example VOR, VOR/DME, and VORTAC. The symbols are usually referenced in the map s legend. Each NDB also has a symbol printed on these maps at each location of the NDB, however, there typically is no printed compass rose for an NDB station. The symbols for the two types of NDB (NDB, NDB/DME) can also be referenced in the map's legend.

While flying an aircraft and navigating a course route via use of radio-navigation aids, the problem for the pilot of an aircraft often is in transposing the information from the instrument display onto an aeronautical map. In large or expensive aircraft this may be done automatically by expensive equipment such as computer systems. This transposing is done so that a graphic depiction of the aircraft's location can be made on the map showing the terrain. The instruments in the aircraft obtain signals from the radio-navigation stations on the ground and are used to plot the location of the aircraft in relation to the bearing and distance from the source of the radio signals which are transmitted from known locations. There are several types of navigational plotters made and sold for the purpose of allowing a pilot to triangulate an aircraft's position based on signals from two or more radio-navigation stations. These plotters are not easy to use and may require too much of a pilot's attention and time during flight. The major problem of these plotters of the prior art is that they require the simultaneous use of both hands to hold the plotter on an aeronautical map and draw the lines for triangulation to determine the location and bearing of the aircraft. The need for frequent triangulation may occur in flight, especially when the flight is conducted in instrument meteorological conditions during which time strict attention must be made to flight instruments in order to avoid unusual attitudes or spatial disorientation. The use of a cumbersome plotting system exacerbates the problem of determining the location and bearing of the aircraft.

The prior art plotters are illustrated by the following patents:

U.S. design patent D269,415 to Paton (Aug. 21, 1983) discloses an ornamental design for a pilot triangulation scale. The design illustrates two arms that are fixed at the ends to the circular members. This fixed attachment of the arms poses the problem when the course of the aircraft is between the two circular members which are assumed to be placed at the location of two radio-navigation stations on a map.

U.S. Pat. No. 4,095,342 to Oertli (Jun. 20, 1978) disclosed a radio navigation aid. This plotter has three compass roses which are preset by reference to a navigational chart to fix the distances and angular bearing between two radio navigational locations and the intended destination. It is clear that this plotter can be used only when two radio navigational locations having strong signals and the destination location is within the distance capabilities of the arms of the device. An extended distance flight is not within the disclosed use of the plotter but requires several devices to be preset for various stages of travel and used in succession. In the event a particular signal from a pre-selected radio navigation station has problems there is no backup suggested in the use of this plotter.

U.S. Pat. No. 4,866,852 to Plier (Sep. 19, 1989) discloses an aeronautic chart course and location locator. The locator is removably attached by means of an adhesive backing to an aeronautical chart.

U.S. Pat. No. 4,879,812 to Rabb (Nov. 14, 1989) discloses an aerial map navigational aid. This device includes two arms that are attached to stick-on discs placed on compass rose stickers on a map. With this device, each arm must be moved separately. Due to the nature of the assembly of this device, if two navigation stations lie close together or the path of fight passes between the stick-on discs placed on the map, the two arms will interfere with each other.

Other navigational patents are:

U.S. design patent D201,385 to Pelletier (Jun. 15, 1965) showing an ornamental design for a navigational plotting instrument.

U.S. design patent D249,656 to Mihail (Sep. 26, 1978) showing an ornamental design for a navigation plotter.

U.S. design patent D250,754 to Gray (Jan. 9, 1979), U.S. Pat. No. 1,942,536 to Clementi (Jan. 9, 1934), U.S. Pat. No. 4,138,817 to Frost et al (Feb. 13, 1979), and U.S. Pat. No. 5,404,648 to Taylor (Apr. 11, 1995) disclose navigation plotters.

Other patents are:

U.S. patent D142,051 to White (Aug. 14, 1945) showing an ornamental design for a drafting instrument that is capable of triangulation.

U.S. design patent D204,805 to Gartman et al (May 17, 1966) showing an ornamental design for a goniometer.

The plotter of the present invention overcomes the inconveniences and deficiencies of the prior art plotters. A pilot or student pilot with only a few hours of flying experience can not afford for safety reasons being diverted away from the hands on operation of the aircraft. Having a plotter that facilitates rapid ability to position, and verify or determine location of an aircraft, is a necessity. Also, having a plotter that accomplishes its job with a minimal amount of required space is another advantage.

OBJECTS AND ADVANTAGES

One of the objects of this invention is to provide a novel and useful aeronautical plotter, for use with radio-navigation instrumentation, which is readily attached to an existing aeronautical map publication to determine the location and bearing of the aircraft during flight.

Another object of the invention is to provide a more efficient and workable design of a navigational plotter, especially a plotter having plotter arms that are moved in unison with a single motion. The plotter of the present invention can be employed using only one hand and in a small space.

Other objects of the invention will become apparent throughout the specification and claims as hereinafter set forth.

BRIEF DESCRIPTION OF THE DRAWINGS

FIG. 4 is a plan-view of a fixed point disc;

FIG. 5 is a cross sectional view, in elevation, of a fixed point disc;

FIG. 5A is a cross sectional view, in elevation, of a fixed point disc and is enlarged to show the details of the central hub attachment;

FIG. 6 is a plan-view of a plotter arm, with distance indicator indicia;

FIG. 9A is an elevation-view of a VOR-based position indicator, with indicator deflection and simulated movement, as it pertains to position movement along course line of FIG. 9;

FIG. 9B is an elevation-view of a VOR-based position indicator, with indicator deflection and simulated movement, as it pertains to position movement along course line of FIG. 9;

FIG. 10A is an elevation-view of a VOR-based position indicator, with indicator showing a "selected radial centered" indication;

FIG. 10B is an elevation-view of an NDB-based ADF (Automatic Direction Finder) position indicator, with the indicator showing a position at an instantaneous position along a course line, relative to the fixed-card heading of zero (0) in the aircraft;

DESCRIPTION OF THE PREFERRED EMBODIMENTS

Figure 1:
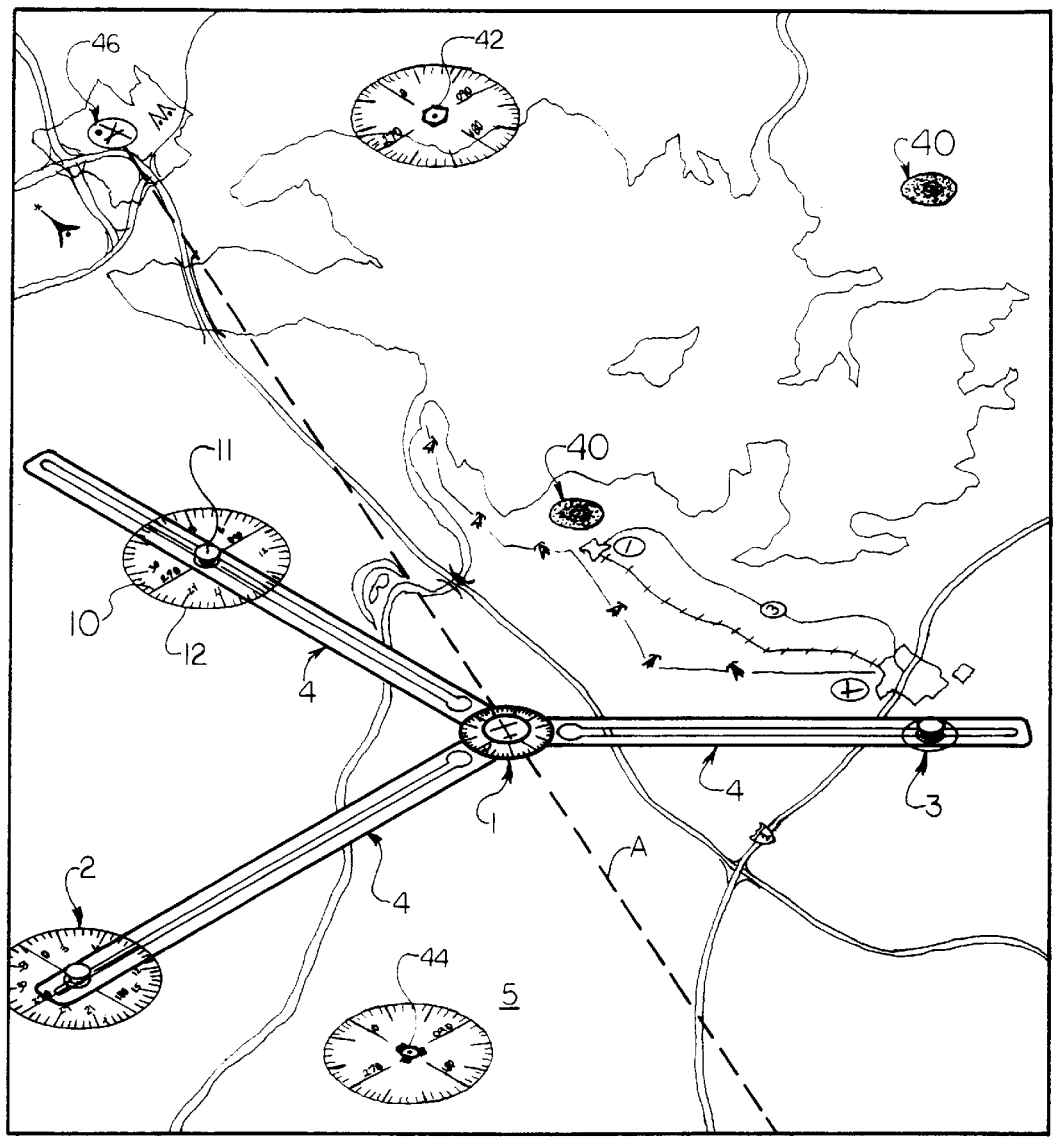
FIG. 1 is an isometric view of a typical aeronautical sectional map, with the navigational plotter of the present invention affixed thereto.

Referring to FIG. 1, a preferred embodiment of the navigational plotter of the present invention is shown. An aircraft position disc 1 is triangulated from at least two fixed point means, illustrated by discs 2 or 3, by plotter arms 4. The preferred embodiment of the fixed point means of the navigational plotter of the present invention is a hub 11 affixed to a navigational aeronautical map or chart 5. Examples of aeronautical publications suitable to be used with the navigational plotter of the present invention include WAC (World Aeronautical Chart), Sectional, TAC (Terminal Area Chart), IFR en-route charts, and NOS (National Ocean Service) instrument approach charts. The plotter of the present invention is easily assembled on a map for flight and takes very little space to use the plotter.

The fixed point means or hub 11 is attached to the map 5. The hub 11 may be directly attached to the map 5 or is a part of a fixed point disc 2 or 3. Fixed point discs 2 and 3 differ in that the discs 2 have a compass rose printed on the disc and are usually larger in diameter whereas the discs 3 have no indicia printed on the disc and are usually smaller in diameter. Each serve the same function which is to provide a fixed point hub 11 affixed to a known location on the map or chart representing a radio source signal having a fixed relationship on the terrain of the map or chart. The usual manner of affixing the hub 11 or the fixed point discs is with adhesive; however, they may be magnetically attached, attached using other securing means such as Velcro. The radio source signal is usually a signal from the known VOR or NDB radio-navigation stations. However, the signal may be received from a satellite rotating around the earth and representing a fixed relation to a point on the earth. The radio-navigation stations are well marked on the available maps and charts used and the fixed point discs 2 or 3 are simply affixed at the point where a source signal will be read by instrumentation on the aircraft. Because of the simplicity of assembling the navigational plotter of the present invention, the discs 2 or 3 may be placed on the map before take-off or in flight.

The fixed point discs 2 and 3, which are a preferred embodiment of attaching the hub 11, are connected to the aircraft position disc 1 by plotter arms 4. The novelty of the arms 4 of the plotter of the present invention is that the end of the arm connected to aircraft position disc 1 is able to slide toward or away from the hub 11 rather than only rotate.

To more fully set forth a preferred embodiment, the specific making of each element of the navigational plotter of the present invention is set forth herein.

Figure 2:
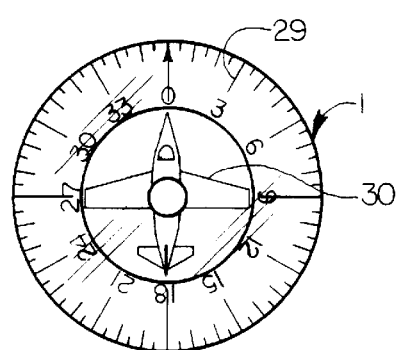
FIG. 2 is a plan-view of an aircraft position disc.
Figure 3:
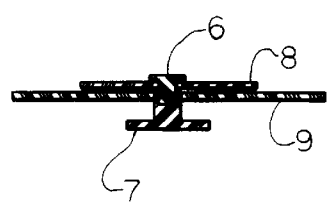
FIG. 3 is a cross sectional view, in elevation, of one embodiment of the aircraft position disc.

Referring to FIGS. 2 and 3, the construction of an aircraft position disc 1 is shown. The aircraft position disc assembly has: a rotational compass card 9 with compass card or protractor type indicia 10 printed thereon; a rotational aircraft orientation disc 8 with a printed aircraft indicia 30 thereon; and a base post 7 and retaining cap 6 for securing the assembly together. Thus, the compass card 9 and aircraft orientation disc 8 are permanently assembled in a rotating fashion, via base post 7 and retaining cap 6.

Referring to FIGS. 4, 5, and 5A, the construction of fixed point discs 2 or 3 is shown. The fixed point discs 2 or 3 are constructed, primarily, of a clear flexible material 12 having an adhesive backing 14 (FIG. 5A). The compass rose discs 2 preferably have protractor-type indicia 10 and the center point discs 3 may or may not have indicia 10. Both center point and compass rose discs have center hub 11 thereon.

Referring to FIG. 6, the construction of a plotter arm 4 is shown. The plotter arm 4 has a guide slot 17 running along the center-line of the length of the arm 4. An opening 16 is at one end of slot 17 for the hub 11 of a fixed point disc 2 or 3 to enter slot 17. Depending on the flexibility of the material used to make the arm 4, an opening 16 may not be needed. Indicia 18 and 19 may be printed on or applied to the plotter arm 4 for giving a scale for reading distances.

Figure 7:
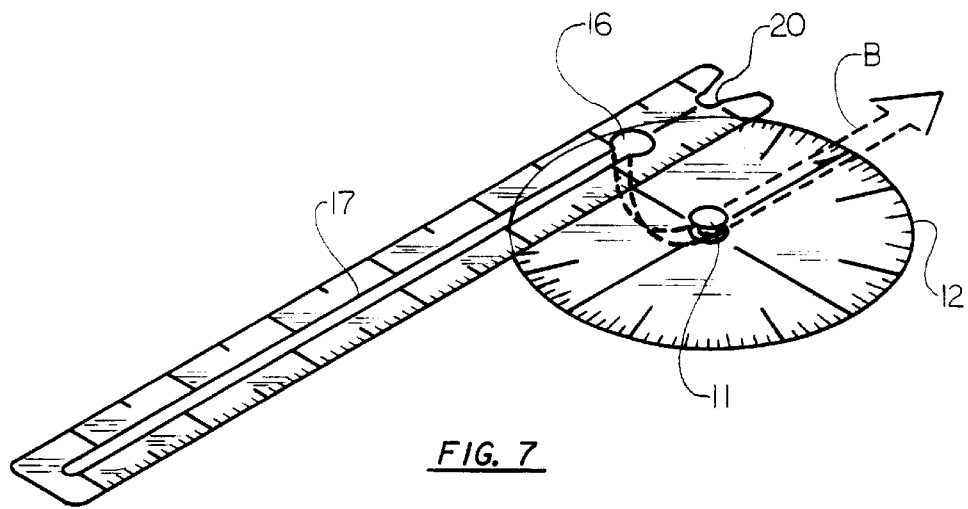
FIG. 7 is an isometric view illustrating the sliding attachment of a plotter arm and a fixed point disc.

A plotter arms 4 is attached to a center hub 11 of a fixed point disc 2 or 3 as shown in FIG. 7. The opening 16 of the arm 4 is placed over a hub 11 for insertion of the hub 11 in the slot 17 of the arm 4. As shown, the arm 4 can rotate and slide over the hub 11. Two or more arms 4 are then connected at their ends by an aircraft position disc 1. Once the aircraft position disc 1 interlocks the arms 4, the total assembly of arms 4 and the aircraft position disc 1 work as a single unit in an inter-locking fashion.

Figure 13:
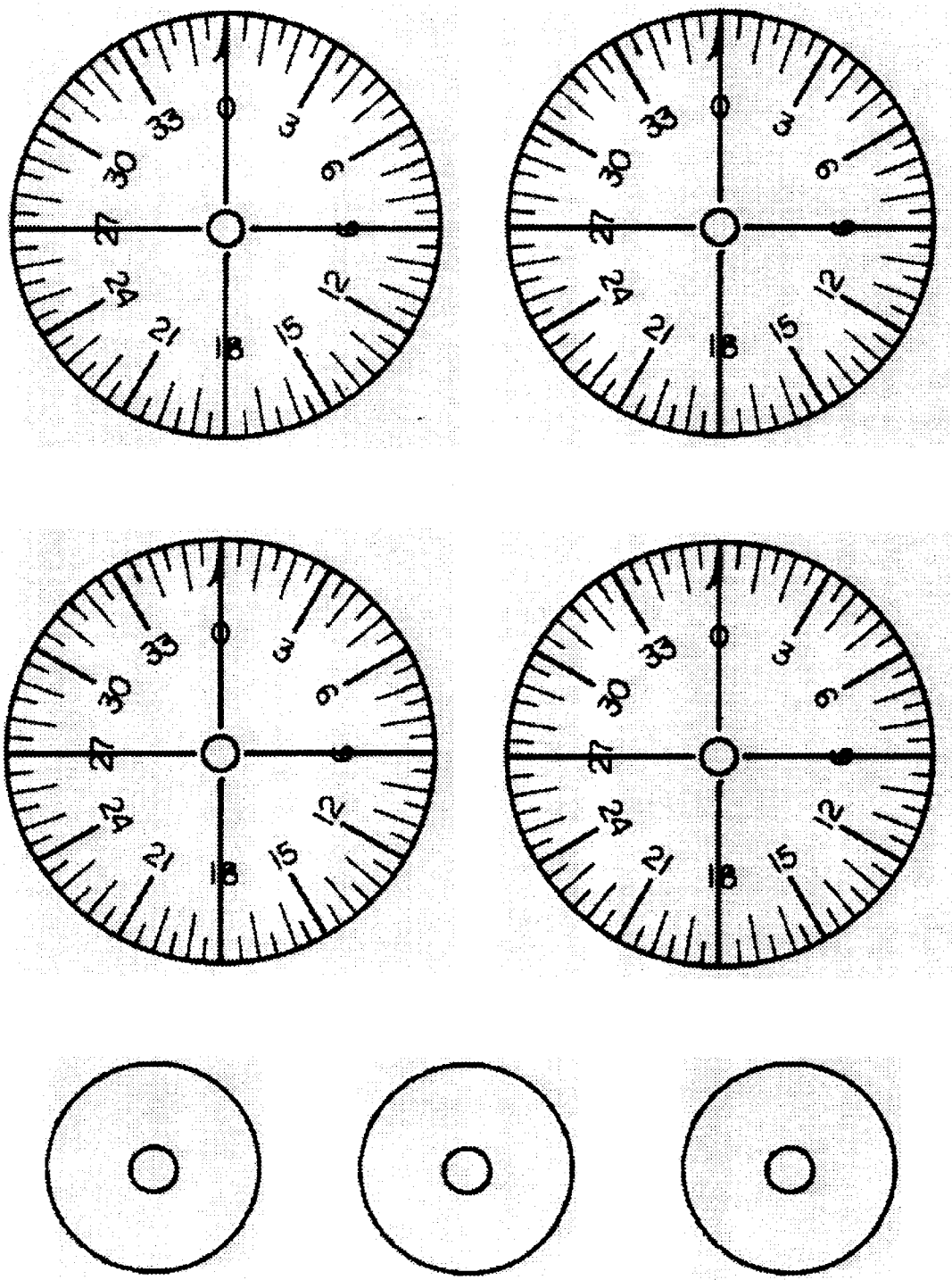
FIG. 13 is illustrative of artwork that can be used to produce a set of fixed point discs.

Further specifics which are set forth for completeness of the best mode now known and not as any limitation of the invention are that center hub 11 may be made preferably of an injection-moldable thermoplastic such as nylon, and is permanently affixed to clear, flexible material 12, that has a pre-manufactured adhesive backing 14, by use of a permanent adhesive 13. To produce compass rose disc 2 and/or center point disc 3 according to that assembly shown by FIG. 5A, I used the following procedure:

1.) Copy or laser print the art such as shown by FIG. 13 onto a clear adhesive film such as 8-½"×11" Raven Repro-Film clear or matte, which has an adhesive back and can be placed in a copy machine or laser printer. The matte seems to work best for image scratch resistance.

2.) Cut out each one of the decals made in the above procedure using scissors or a die that cuts each of the decals out at the proper diameter.

3.) Machine one (1) each of the center hubs 11 FIG. 5A, for each decal made from a material such as clear acrylic or other plastic.

4.) Attach one (1) each of the center hubs 11 FIG. 5A to one (1) each of the decals using an adhesive 13 FIG. 5A, such as Eclectic Products, Inc. E6000 industrial strength adhesive & sealant.

5.) Allow adhesive to cure per manufacturer instructions.

Figure 14:
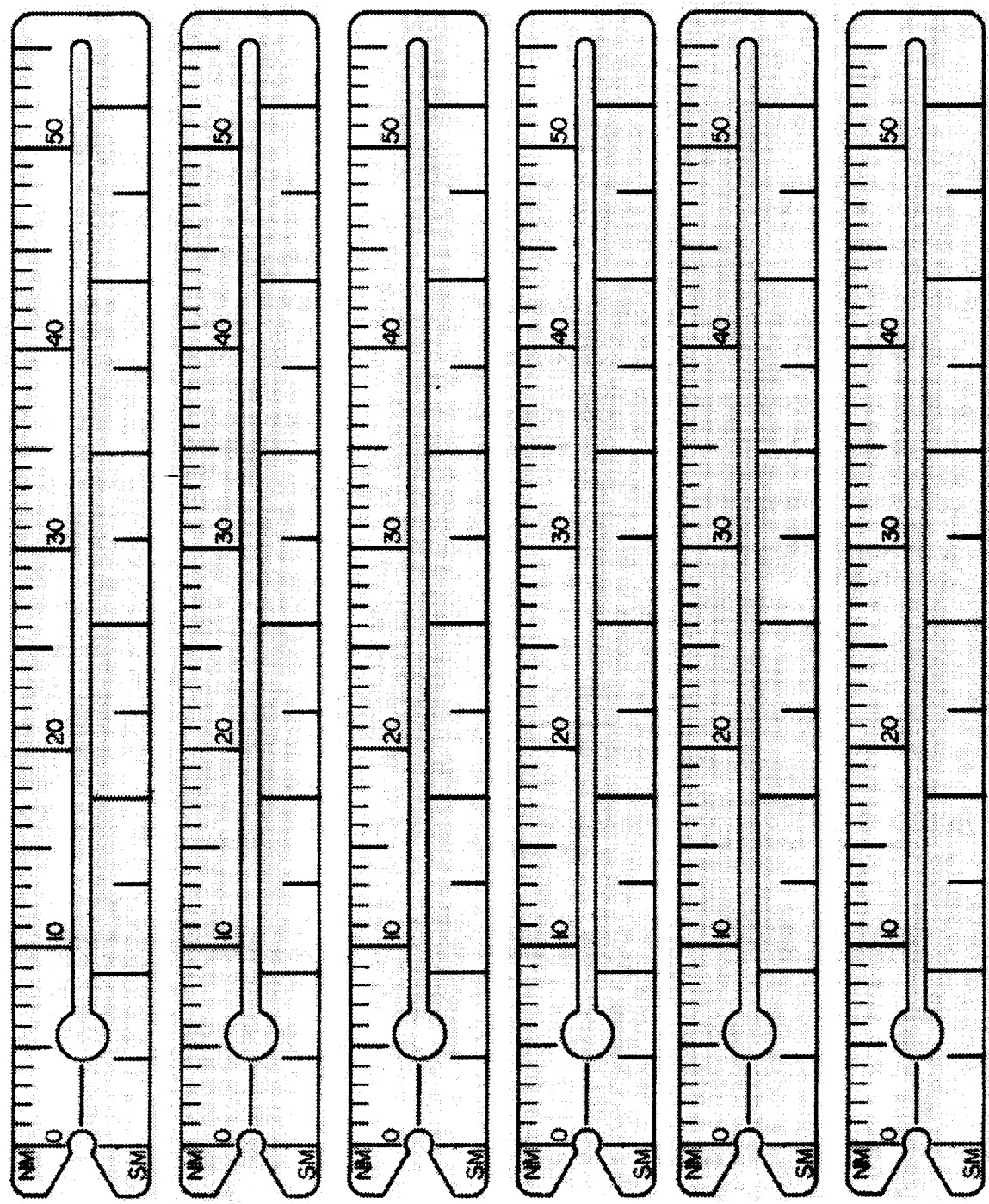
FIG. 14 is illustrative of artwork that can be used to apply measuring indicia on a plotter arm.

A set of plotter arms 4 may be made per a similar procedure of the above as follows:

1.) Copy or laser print the art such as shown by FIG. 14 onto a clear adhesive film such as 8-½"×11" Raven Repro-Film clear or matte, which has an adhesive back and can be placed in a copy machine or laser printer. The matte seems to work best for image scratch resistance.

2.) Apply the entire decal sheet made in the step above to a piece of 0.030" thk clear acetate film, such as is sold in hobby shops for use as remote-controlled aircraft windshields.

Figure 8:
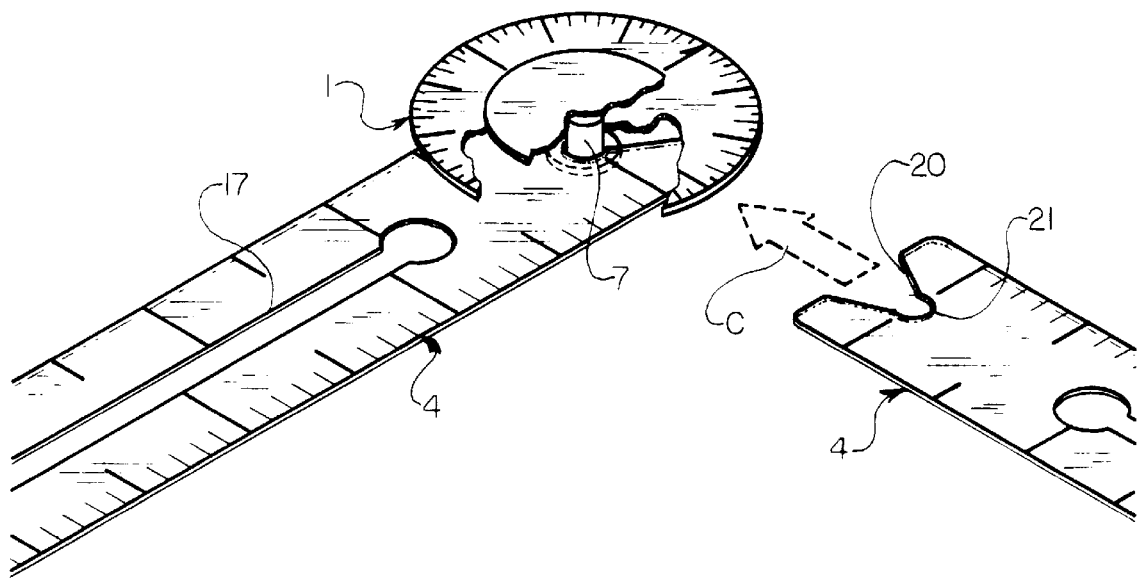
FIG. 8 is an isometric view illustrating the attachment of an aircraft position disc to the ends of a plotter arm, showing that the position disc is attached in rotational, removable fashion.

3.) Using an X-acto knife, or other adequately sharp object, cut out the material where the guide slot 17, center hub clearance hole 16, connection guide slot 20, and interlocking slot 21 are shown FIGS. 6, 7, & 8. Also, follow the lines to trim around the edges of the plotter arms if so desired.

Figure 15:
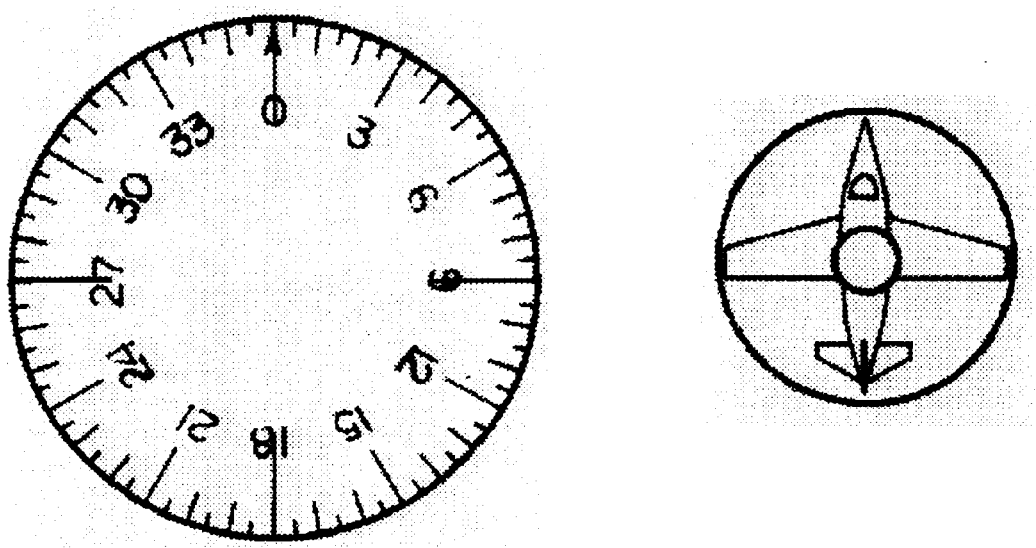
FIG. 15 is a illustrative of artwork that can be used to apply indicia on the aircraft position disc.

The aircraft position disc assembly 1 FIGS. 2 & 3 is made as follows:

1.) Copy or laser print the art such as shown by FIG. 15 onto a clear adhesive film such as 8-½"×11" Raven Repro-Film clear or matte, which has an adhesive back and can be placed in a copy machine or laser printer. The matte seems to work best for image scratch resistance.

2.) Apply the decal sheet made in the step above to a piece of 0.030" thk clear acetate film, such as is sold in hobby shops for use as remote-controlled aircraft windshields.

3.) Machine a base post 7 and retaining cap 6 FIG. 3 out of a plastic such as clear acrylic.

4.) Cut and trim material from the compass card 9 and aircraft orientation disc 8 such that they may be assembled as shown of FIG. 3.

5.) Apply glue, such as a super glue, only to retaining cap 6 and base post 7 at the point where they join, so that aircraft orientation disc 8 and compass card 9 remain free to rotate once the glue has set. A screw will work also in lieu of retaining cap 6.

Figure 10:
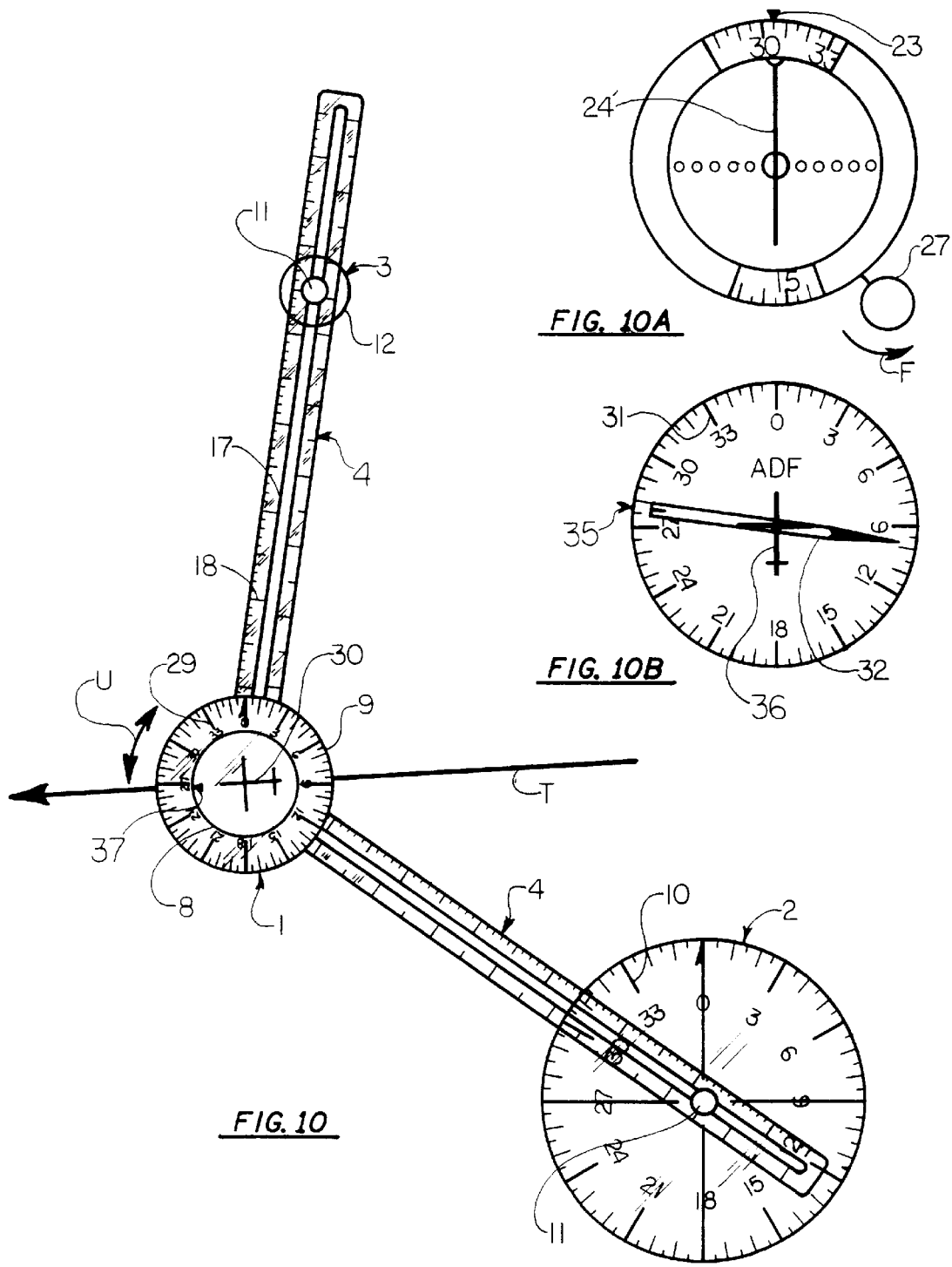
FIG. 10 is a plan-view of the navigational plotter of the present invention showing progression along a selected course route navigated by using one VOR receiver indicator and one ADF indicator, and demonstrating the changes that occur to the navigational plotter as it is moved with changing aircraft position.

Various pointers and other indicia such as aircraft orientation disc heading pointer 37 FIG. 10 may be added for the purposes of orienting the plotter. The above assembly method was used to make and test a limited number of plotter assemblies.

The assembly procedure may be automated by pre-printing the plotter arm indicia 18, protractor-type indicia 10, compass card indicia 29, and aircraft indicia 30 on the material to be used with some automated process, then die-cutting the parts out in mass quantities. Other assembly methods are also possible.

OPERATION OF THE PREFERRED EMBODIMENT

Again referring to FIG. 1, at least two hubs 11 are placed at any predetermined location on an aeronautical map 5. Usually the fixed point discs 2 or 3 are used and are attached to the aeronautical map or chart 5 before take-off to specific landmarks such as an airport or a radio-navigation station. As shown in FIG. 1 the map 5 has a large number of NDB stations 40, VOR stations 42 or VORTAC stations 44 that are used for navigation. Fixed point disc 2 is placed over a VOR station and fixed point disc 3 is placed over a NDB station, for purposes of illustration, before take-off from airport 46. FIG. 1 shows a a course line "A" as the intended course and at least a single radio signal device is needed. Using the radio signal device, reading are obtained from each station and the radial from the station to the aircraft. The plotter arm 4 is moved to that radial. This operation is repeated for each station and the triangulation pin points the location of the aircraft. In some aircraft there is more than one instrument and each instrument may be used with a specific station.

Figure 9:
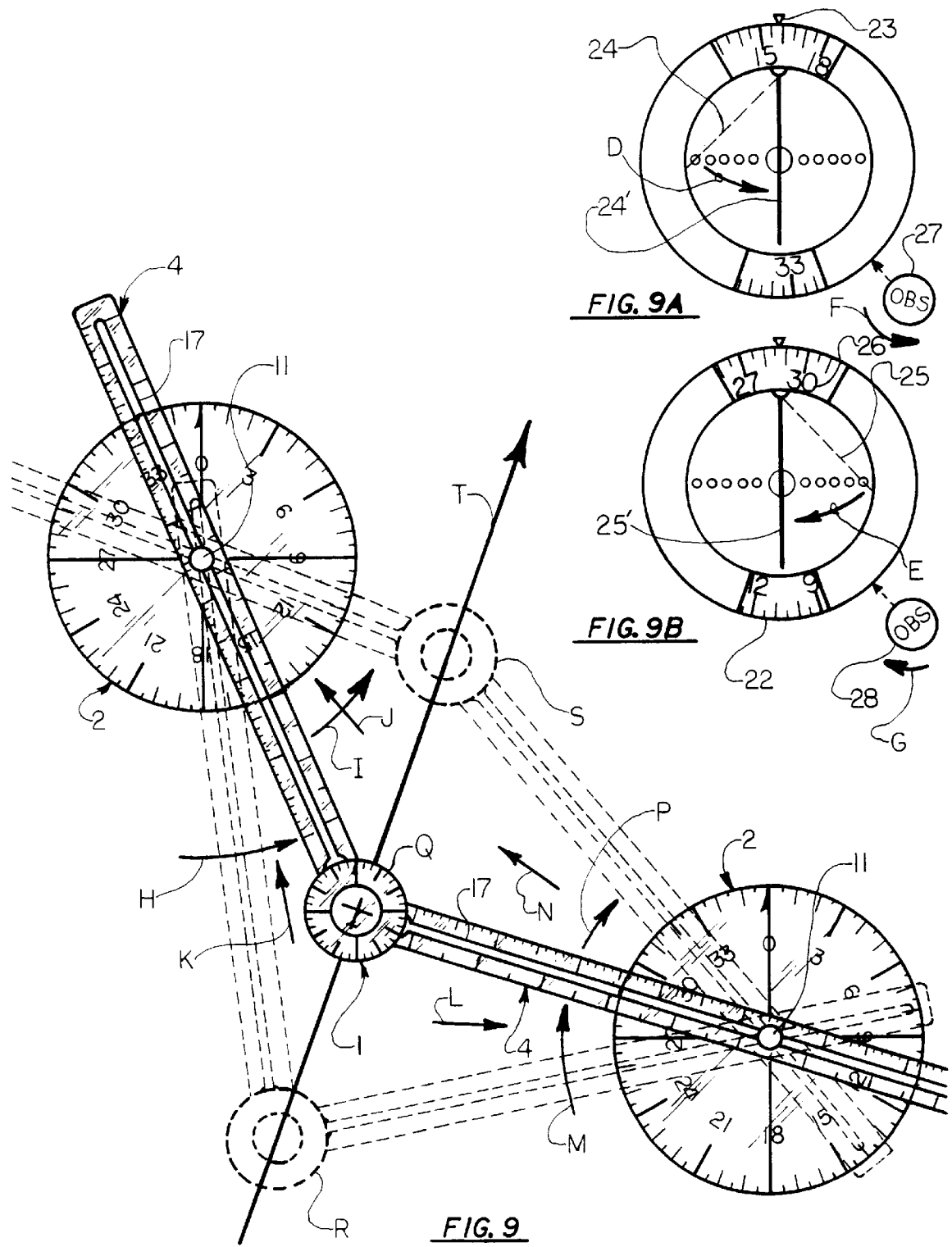
FIG. 9 is a plan-view of the navigational plotter of the present invention showing progression over a map along a selected course route that is navigated via VOR receiver indicators, and demonstrating the changes that occur to the navigational plotter as it is moved with changing aircraft position.

Referring to FIGS. 9, 9A and 9B, course "T" is a desired route to be flown. These figures illustrate an aircraft with two VOR instruments (see OBS 27 and OBS 28) which provide radials from two different stations. The arm 4 on the left is used to transcribe the radial of the top VOR instrument (OBS 27) and arm 4 on the right is related to the radial read from the lower VOR instrument. Adjusting the arms 4 to the two radials read from the instruments the location of the aircraft is pinpointed.

Referring to FIGS. 10, 10A, and 10B, these figures illustrate the use of one VOR instrument and one ADF instrument. The transcription of the radials obtain from these instruments again pinpoint the location of the aircraft.

Figure 11:
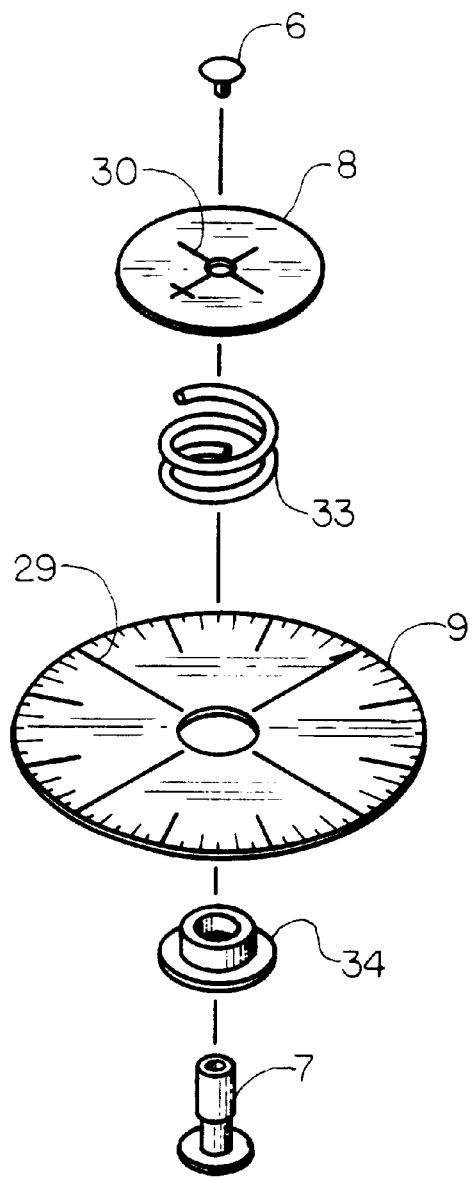
FIG. 11 is an exploded isometric view, in section, of a spring biased embodiment of an aircraft position disc.
Figure 12:
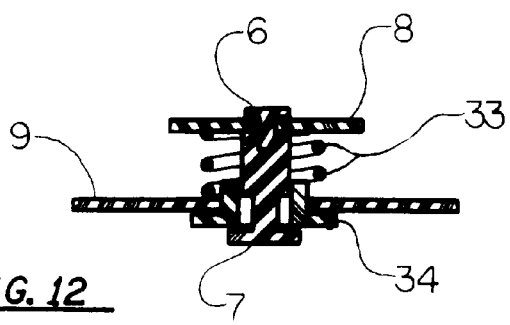
FIG. 12 is an elevation, in cross-section, of the spring biased embodiment of an aircraft position disc of FIG. 11.

FIGS. 11 and 12 illustrate an alternative construction of the aircraft position disc 1. A spring 33 is positioned between the orientation disc 8 and the compass card 9, and a pressure disc 34 is positioned below the compass card 9. When the pressure card 9 is lifted from the base of the base post 7, the ends of arms 4 are insertable in the reduced diameter of the post 7. This spring bias holds the ends of the arms 4 and the aircraft position disc 1 firmly together.

The foregoing disclosure and description of the invention is illustrative and explanatory thereof and various changes in the method of use, as well as the apparatus, may be made such as: constructing the plotter assembly of wood, thick transparent material, or other construction, such that the invention may be used in a larger scale for instructional purposes, wall chart flight planning, or other use not for actual navigation; use of the method as applied to other charts intended for navigation. It should be appreciated that such changes may be made within the scope of the appended claims.

What is claimed is:

1. A navigation plotter having, a pair of plotter arms, an aircraft position disk retaining means to which the ends of each of the plotter arms are rotatably and non-slidably connected, slots in each of the plotter arms, and two fixed point disks that are affixable to a navigation chart, about which the plotter arms are attached and may both slide and rotate within the slots of each of the plotter arms.

2. A navigation plotter having, a pair of plotter arms, an aircraft position disk retaining means to which the ends of each of the plotter arms are connected in a manner which allows rotation but not sliding of the aircraft position disk, slots in each of the plotter arms, and two fixed point disks with a compass rose printed upon them that are affixable to a navigation chart, about which the plotter arms are attached and may both slide and rotate within the slots of each of the plotter arms.

3. A navigation plotter having, a pair of plotter arms, an aircraft position disk retaining means with an aircraft image imprinted on it to which the ends of each of the plotter arms are connected in a manner which allows rotation but not sliding of the aircraft position disk, slots in each of the plotter arms, and two fixed point disks that are affixable to a navigation chart, about which the plotter arms are attached and may both slide and rotate within the slots of each of the plotter arms.

\* \* \* \* \*